United States Patent [19]

Kawashima

[11] Patent Number: 4,505,440
[45] Date of Patent: Mar. 19, 1985

[54] TAPE CASSETTE

[75] Inventor: Takao Kawashima, Saitama, Japan

[73] Assignee: Pioneer Electronic Corporation, Tokyo, Japan

[21] Appl. No.: 394,960

[22] Filed: Jul. 2, 1982

[30] Foreign Application Priority Data

Jul. 3, 1981 [JP] Japan .................. 56-99705[U]
Jul. 8, 1981 [JP] Japan .................. 56-102282[U]
Jul. 8, 1981 [JP] Japan .................. 56-102283[U]
Jul. 20, 1981 [JP] Japan .................. 56-107412[U]

[51] Int. Cl.³ .................. G03B 1/04; G11B 15/32
[52] U.S. Cl. .................. 242/199; 360/132
[58] Field of Search .......... 242/71.8, 71.9, 197–199, 242/200; 360/93, 96.1, 132; 400/207, 208, 208.1; 361/212, 214; 353/120; 352/72, 78; 206/389, 393

[56] References Cited

U.S. PATENT DOCUMENTS

| 3,207,456 | 9/1965 | Hill | 242/71.9 X |
| 3,685,893 | 8/1972 | Castedello | 353/120 |
| 4,289,285 | 9/1981 | Ishida et al. | 242/199 |
| 4,367,963 | 1/1983 | Daughters | 400/208 |
| 4,387,864 | 6/1983 | Posso | 242/199 |

*Primary Examiner*—Leonard D. Christian
*Attorney, Agent, or Firm*—Sughrue, Mion, Zinn, Macpeak, and Seas

[57] ABSTRACT

A tape cassette having improved transport capabilties includes frictional sheet members mounted either stationarily or rotatably to impart a frictional back tension on the tape via the tape reels.

15 Claims, 13 Drawing Figures

TAPE CASSETTE

BACKGROUND OF THE INVENTION

The present invention relates to an improvement in a reel-to-reel tape cassette.

As shown in FIG. 1 of the accompanying drawings, a conventional tape cassette includes a cassette half 1 lined interiorly with a film or sheet 2 of tetrafluoroethylene or Teflon TM to facilitate transport of a tape 3. Direct frictional contact between the tape 3 and the sheet 2, however, causes a frictional sound. Such direct frictional contact is also disadvantageous in that as the diameter of the tape roll varies, the area of contact between the tape roll wound on the reel hub and the sheet also varies, resulting in a fluctuation of the back tension to which the tape is subjected. Another problem with the prior tape cassette is that the characteristics of the sheet vary with temperature and humidity, causing back tension fluctuations responsible for irregular tape winding and tape elongation.

To eliminate the foregoing difficulties, there has been proposed a tape cassette including reel hubs (hereinafter referred to as a "reel") disposed in a cassette half and having flanges made of a relatively rigid and heavy material.

These reels are highly advantageous when used on open-reel tape decks. However, they cause reel-to-reel tape cassettes to suffer from the following shortcomings.

Due to the large inertia of the reel upon rotation, the reel fails to stop quickly. This causes an increased length of tape to tend to be forced off or loosened from the reel. When the tape is to be driven again, no back tension is imposed on the tape, a condition which prevents optimum recording and playback operation. Furthermore, the tape is likely to be displaced onto the upper surface of the flanges and the lower surface of the cassette, with the result that the tape cannot travel or is cut.

Tapes for use on open reels have a relatively large thickness of from 29 to 53$\mu$, and hence are less subject to damage even when brought into contact with the reel flange. However, tapes for use in tape cassettes are relatively thin, say 9 to 18$\mu$, and more prone to damage when in contact with the reel flange. This difficulty becomes fatal especially when the tape is to be wound or rewound at high speed.

The reel flange produces noise when it hits the cassette half during rotation of the flange, and the noise thus generated is irritating particularly when the tape deck is in a fast forward or rewinding mode of operation.

If the reel remains unlocked and freely rotatable when the cassette is carried about, the tape tends to be unwound from the reel due to vibration, and the unreeled tape may become entangled with the reel or subjected to no back tension.

SUMMARY OF THE INVENTION

To overcome the above problems, a tape cassette according to the present invention includes means by which frictional forces are applied to the reels to keep the tape under suitable back tension.

BRIEF DESCRIPTION OF THE DRAWINGS

The present invention will now be described with reference to the drawings, in which.

DETAILED DESCRIPTION OF THE PREFERRED EMBODIMENTS

Figure 1:
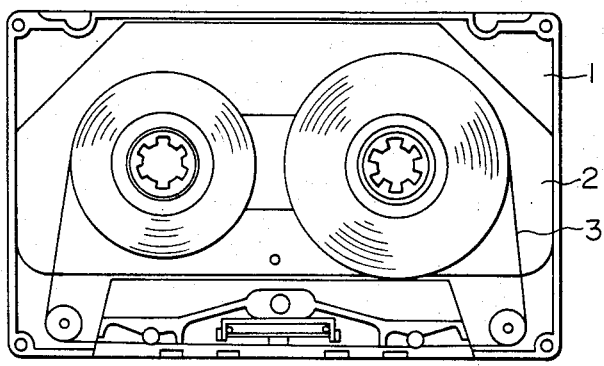
FIG. 1 is a view showing the interior of a conventional tape cassette.
Figure 2:
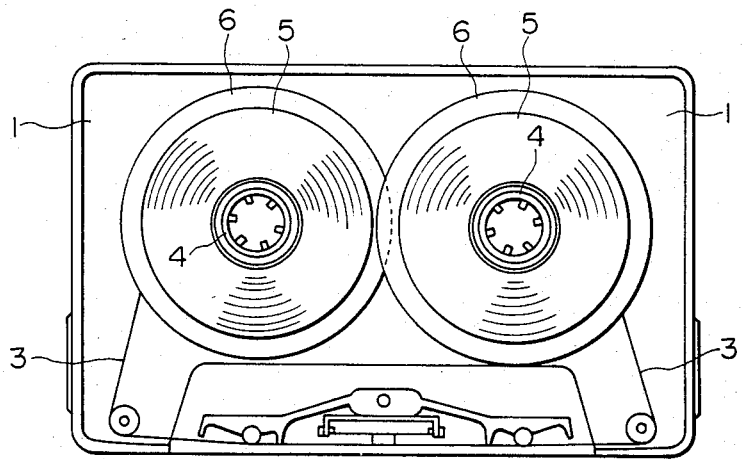
FIG. 2 is a view showing the interior of a tape cassette according to one embodiment of the present invention.
Figure 3:
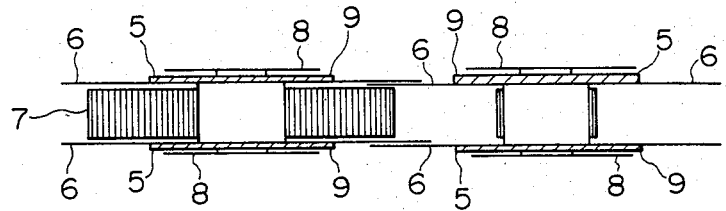
FIG. 3 is a cross-sectional view of a portion of a tape cassette according to another embodiment.
Figure 4:
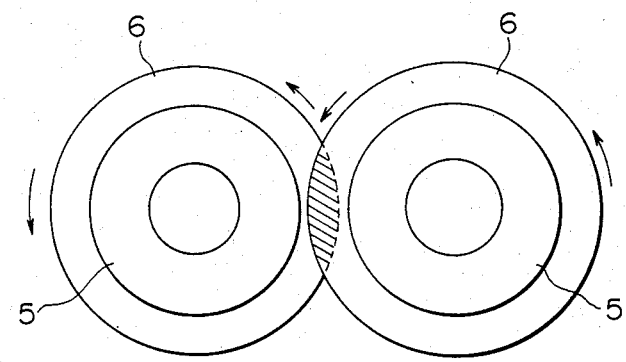
FIG. 4 is a schematic view illustrative of the manner in which the tape cassette of the present invention operates.

As shown in FIGS. 2 and 3, a tape cassette 1 has therein reels 5 including flanges 9, and annular sheets 6 secured to the undersides of the flanges 9. The annular sheets 6 have a diameter such that they overlap, one lying on the other, and the sheets have an outer peripheral edge projecting radially outwardly beyond the circumference of a tape roll when fully wound on either one of the reels.

With the reel-to-reel tape cassette thus constructed, the sheets in lateral pairs lie on one another centrally of the cassette and frictionally slidable with respect to each other during rotation of the reels, so that the sheets are subjected to forces imposed in opposite directions. The tape is thus held under constant back tension without being adversely affected by variations in the tape roll diameter, temperature and humidity. Therefore, the tape is prevented from being irregularly wound on the reels and also from being forcibly stretched.

Since the lateral pair of reels 5 undergoes a constant amount of sliding friction at all times, there is no danger of the reel from which the tape is unwound continuing to rotate due to inertia when the tape travel is stopped, with the result that unwanted lengths of tape are prevented from being unwound from the tape roll.

The sheets 6 interposed between the tape roll 7 and the flanges 9 of the reel 5 protect the tape against direct contact with the reel 5. The tape, which is relatively thin for use in the cassette, is therefore prevented from being damaged or stretched by contact with the reel. No direct contact between the hard reel and the tape ensures that the tape will not produce noise while travelling.

The laterally disposed sheets 6 secured to the reels 5 and lying partially on one another allow the tape to be wound into a roll on the reel hub 4 until a roll with a diameter larger than the diameter of the reel is produced. Thus, even if the roll wound on the hub is larger in diameter than the reel, the tape is prevented from being displaced from the reel. This eliminates the necessity of using an extremely thin tape for long playing tapes, and such cassettes are rendered more durable in use.

According to a modification of this embodiment, sheets 8 may be mounted on the outer sides of the reels 5, and the sheets 6 may be fixed to the flanges 9. With such a construction, friction between the cassette half 1 and the reels 5 can be reduced for smoother rotation of the reels 5.

Also, the sheets of any of the disclosed embodiments may be transparent, and the cassette half may be transparent in its entirety or at least at portions with which the reels engage.

Figure 5:
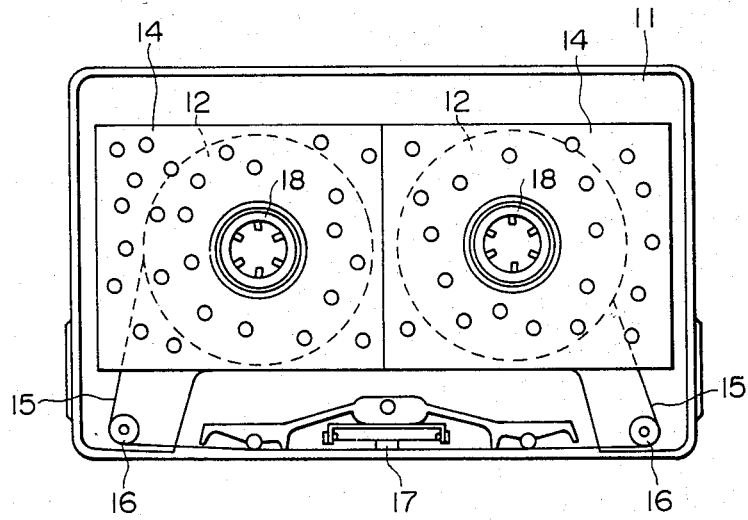
FIG. 5 is a plan view, partly broken away, of a tape cassette according to another embodiment of the present invention.
Figure 6:
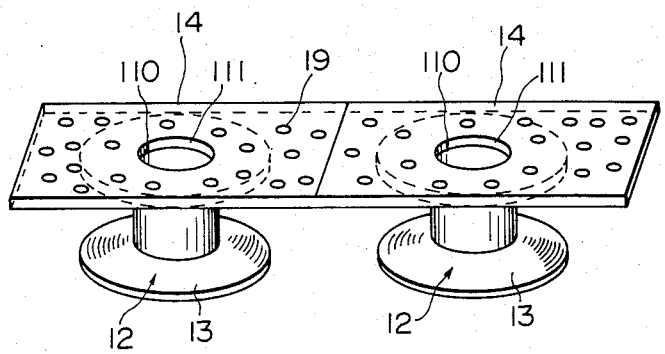
FIG. 6 is a perspective view of a portion of the tape cassette shown in FIG. 5.
Figure 7:
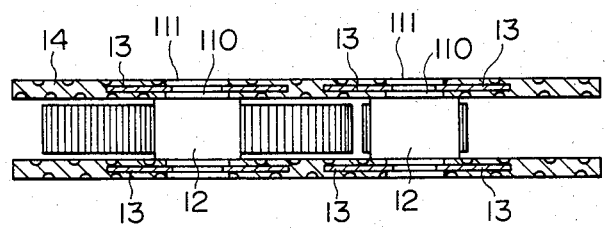
FIG. 7 is a cross-sectional view of a portion of the tape cassette of FIG. 5.

Another embodiment will now be described with reference to the accompanying drawings. FIGS. 5 through 7 show a reel-to-reel tape cassette comprising cassette halves 11, reels 12, a sheet 14, tape 15, guide rollers 16 and a pad 17.

Each of the reels 12 has a takeup hub 18 having at the ends thereof a pair of flanges 13, at least one of which is sandwiched by the sheet 14. The sheet 14 covers those flanges which are laterally disposed in side-by-side relation on one side of the hubs 18.

The sheet 14 has a plurality of small protrusions 19, a pair of hub holes 110 spaced from each other by a distance at which the laterally disposed takeup hubs 18 are spaced from each other, and another pair of hub holes 111, which will be aligned with the respective hub holes 110, when the sheet 14 is folded on itself at its opposite end portions. The sheet 14 has a width greater than the diameter of the reels, and a length such that the folded structure of the sheet has ends extending outwardly beyond the reels.

With the tape cassette thus constructed, the plurality of small protrusions 19 on the sheet are pressed against the flanges 13 to impose suitable frictional forces on the reels as they rotate.

The frictional engagement between the sheet 14 and the flanges 13 prevents the supply reel from being idly rotated due to the inertia thereof when tape movement is stopped. Thus, the tape will not be displaced from the reel or loosened on the reel, and is always kept under back tension, which would otherwise be lost, adversely affecting the recording and playback modes of operation.

With the reels subjected to frictional forces, there is no tendency for the tape to become loosened or fall off even when the reels are rotatable while the tape cassette is being transported about.

Furthermore, since the flanges 13 of the reels 12 are covered by the sheet 14, the tape is kept from direct contact with the flanges for protection against damage.

The sheet 14, which extends outwardly beyond the diameter of the reels, allows the tape to be wound as a tape roll having a diameter greater than that of each reel without the risk of being displaced from the reel. Thus, a longer playing tape can be made using the tape cassette of the invention.

According to a modification of the invention, the sheet 14 as described above may be transparent, and the cassette half may also be transparent bodily or at least at portions thereof with which the flanges are held in engagement.

The flanges of any of the embodiments of this invention may have a spiral through hole or transparent portion, or may be transparent and electroplated with a thin layer of metal leaving a spiral transparent portion. This arrangement is advantageous in that the user can easily determine whether the reels are rotating or not, and the direction or rotation thereof. The transparent portion may be graduated with markings such as 0, 50, 100 for easy visual monitoring of the amount of tape left on the reels.

Another embodiment of the present invention will now be described with reference to the accompanying drawings.

Figure 8:
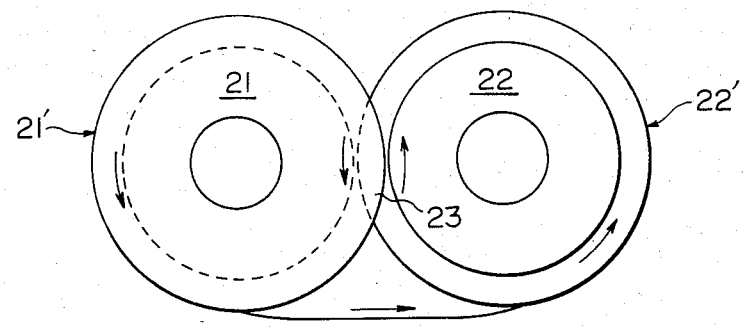
FIG. 8 is a plan view of tape reels according to another modification of the present invention, the tape reels being positioned as mounted in a cassette half.

FIG. 8 is a plan view of tape reels having flanges designed according to the present invention. A flanges 21 is mounted on the tape supply reel, for example, and a flange 22 is mounted on the tape takeup reel. The flanges are rotatable in the directions of the arrows. The flanges have outer peripheral edge portions 23 lying on one another and are rotatable in frictional contact with each other in opposite directions. The flanges areas 23 thus serve to brake rotation of the flanges 21, 22.

Figure 9:
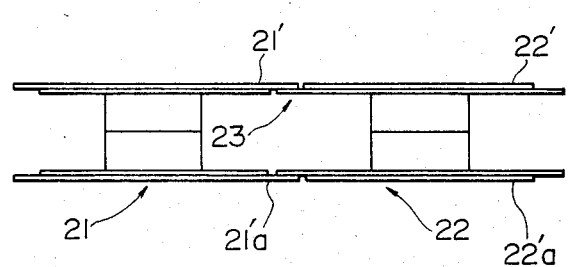
FIG. 9 is a side elevational view of the tape reels shown in FIG. 8.

FIG. 9 is illustrative of the manner in which the outer peripheral edges of the flanges lie on each other. Cap sheets 22', 22'a are fitted over a takeup hub shaft 25 and are disposed in a partially superimposed relation between cap sheets 21', 21'a fitted over a supply hub shaft 24, a construction by which the flanges are held in contact with each other. The flanges jointly define an extended support for allowing a tape roll to grow beyond the diameter of an individual flange.

Figure 10:
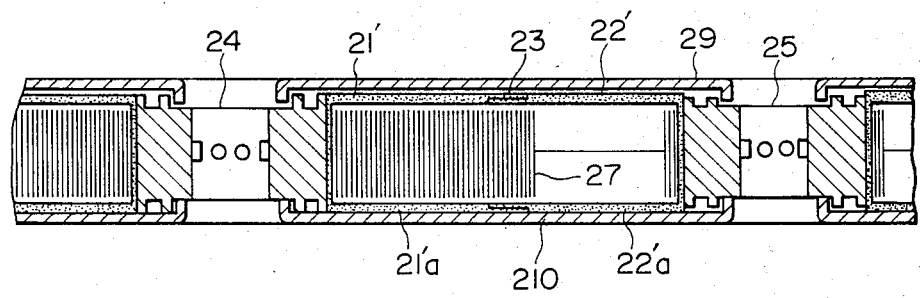
FIG. 10 is a fragmentary cross-sectional view of the wound tape reels.

FIG. 10 shows the above construction, in which a tape roll 27 is wound around the supply reel 24.

When the tape 28 is caused to travel in the direction of the arrow so as to be unwound from the supply hub shaft 24 and wound around the takeup hub shaft 25, the superimposed portions 23 of the supply and takeup flanges rotate in opposite directions and are subjected to friction, tending to brake the rotation of the flanges. This gives the running tape back tension sufficient to stop rotation of the tape reels or flanges immediately.

There is a need at times to wind in a cassette, a tape which is longer than a predetermined length. If such a tape were to be wound on a conventional flanged hub, the tape would form a tape roll having a diameter larger than that of the flange since the flanges on the supply and takeup reels are disposed in side-by-side relation in cassette halves 29, 210 and are out of contact with each other. A length of the tape roll 27, with the result that the unwound tape would be damages or could not be fed. With the present invention, however, the flanges are of a diameter greater than that of prior flanges and have outer peripheral edges lying partly on each other, an arrangement which increases the combined flange diameter and the space for winding the tape therein. Thus, a tape roll can be formed which has a diameter larger than the outside diameter of each flange, and the tape will not accidentally be unwound from the roll. At this time, the tape roll enters the tape winding space in the supply reel. To allow the tape to be introduced smoothly without being obstructed by a step which would be formed by superimposed flanges, the flanges have on their peripheral edges steps 21'b, 22'b, respectively, which mate with each other to thereby eliminate any step.

Figure 11:
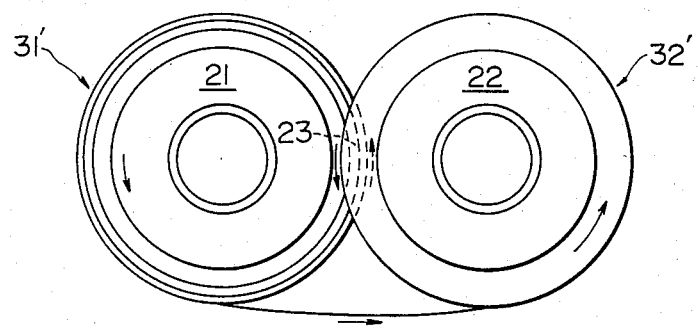
FIG. 11 is a plan view of tape reels according to a further modification.

FIG. 11 is a plan view of tape reels having similar flanges as in FIGS. 8-10. The flange portions 23 serve to brake rotation of the respective flanges 21, 22, as before.

Figure 12:
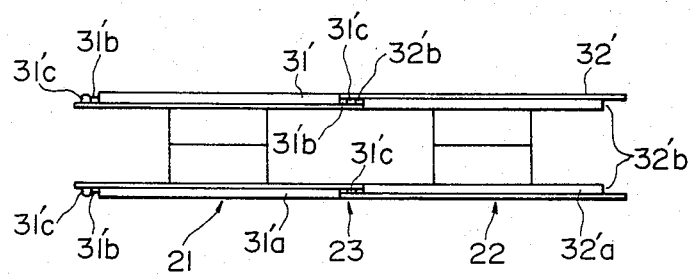
FIG. 12 is a side elevational view of the tape reels shown in FIG. 11.

FIG. 12 is illustrative of the manner in which the outer peripheral edges of the flanges lie on each other. Cap sheets 31', 31'a are fitted over a supply hub shaft 24 and are disposed in partially superimposed relation between cap sheets 32', 32'a fitted over a takeup hub shaft, a construction by which the flanges are held in contact with each other. As before, the flanges jointly define an extended support for allowing a tape roll to grow beyond the diameter of each flange. The cap sheets 31', 31'a and 32', 32'a or the flanges have on their outer peripheral edges steps 31'b, 32'b which confront each other at the superimposed outer peripheral edge portions of the flanges to prevent their combined thickness from being increased. One of the steps, for example, the step 31'b of the supply reel 21 has a small circuilar protrusion 31'c. When the step 32'b of the other reel, that is, the takeup reel, is placed on the circular protrusion 31'c, the step 32'b is pressed against the circular protrusion. The circular protrusion may be replaced by a plurality of annular or small-sized circular protrusions spaced at equal intervals.

Figure 13:
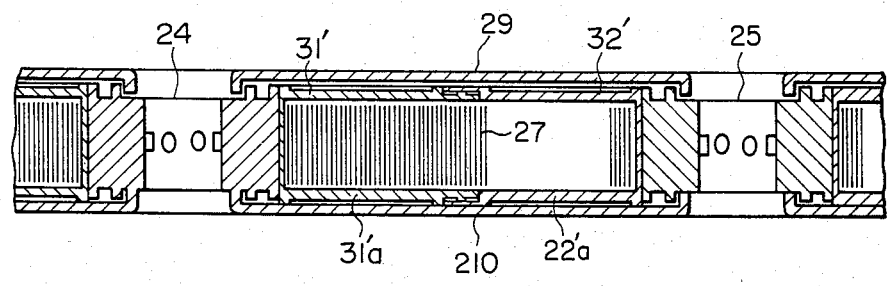
FIG. 13 is a fragmentary cross-sectional view of the tape reels, having a tape wound therearound.

FIG. 13 shows the above construction, where a tape is wound around the supply reel to form a tape roll which extends radially beyond the cap sheets 31', 31'a.

When the tape is caused to travel in the direction of the arrow so as to be unwound from the supply hub shaft 24 and wound around the takeup hub shaft, the superimposed portions of the supply and takeup flanges rotate in opposite directions and are subjected to friction, tending to brake the rotation of the flanges. This gives the running tape a back tension large enough to be effective to stop rotation of the tape reels or flanges immmediately. As described above, one of the steps on the outer peripheral edge portions of the flanges has a circular protrusion against which the other step is pressed, so that the flanges are reliably held in mutual contact at their superimposed portions. The flanges as they rotate undergo friction at their superimposed portions, imparting back tension to the tape while running. With the tape held under such back tension, the flanges can be stopped quickly.

What is claimed is:

1. A reel-to-reel tape cassette, comprising; a pair of reels for carrying a tape, each of said reels having at least one flange with the flanges being on the same side of said tape, sheets fixed to the undersides of said reel flanges, for joint rotation therewith, said sheets being positioned laterally of each other and having portions overlying one another centrally of the tape cassette.

2. A cassette as claimed in claim 1, said overlying portions being in frictional contact with each other, to provide a force resisting tape transport.

3. A cassette as claimed in claim 2, said sheets comprising circular sheets having diameters larger than that of said reel flanges.

4. A cassette as claimed in claim 1, further including further sheets interposed between outer sides of said reel flanges and the body of said cassette.

5. A reel-to-reel tape cassette, comprising: a casing having an inner surface; first and second hubs within said casing for carrying a tape, said first and second hubs having first and second flanges, respectively, with both of said first and second flanges being on the same side of said tape between said tape and said inner surface, said hubs being disposed laterally in side-by-side relation, said tape cassette further comprising at least one sheet having a plurality of small protrusions, said at least one sheet being disposed between said tape and said flanges and between said flanges and said casing inner surface.

6. A tape cassette as claimed in claim 5, wherein said at least one sheet comprises a single sheet adapted to be folded over said flanges, said at least one sheet having a first pair of holes in registry with said hubs and a second pair of holes which align with said hubs when said at least one sheet is folded over said flanges.

7. A tape cassette as claimed in claim 5, wherein said at least one sheet defines an enclosure within which said first and second flanges are substantially contained, said protrusions facing inwardly of said enclosure to abut axially inner and outer surfaces of said flanges.

8. A reel-to-reel tape cassette comprising:
a pair of hubs for carrying a tape, each of said hubs having at least one flange with the flanges being on the same side of said tape, said hubs being disposed laterally in side-by-side relation, said cassette further comprising at least one generally rectangular sheet, said sheet having a plurality of protrusions and adapted to fold over upon itself to form a rectangular structure having end portions extending beyond peripherally outer edges of and enclosing said flanges.

9. A tape cassette, comprising: tape reels including flanges, said flanges having an outside diameter larger than the distance between centers of said flanges, said flanges having outer peripheral edges lying on one another in mutual contact when said tape reels are mounted in said cassette, said outer peripheral edges being thinner than remaining portions of said flanges, said thinner portions overlapping to form a combined thickness substantially equal to that of said remaining portions.

10. A tape cassette as claimed in claim 9, said flanges being in frictional contact so as to oppose transport of said tape.

11. A tape cassette as claimed in claim 1, wherein top and bottom surfaces of adjacent flanges are substantially respectively coplanar.

12. A tape cassette, comprising; tape reels mounted on takeup and supply shafts and having flanges, said flanges having an outside diameter larger than the distance between said tape supply and takeup shafts, one of said flanges includind a protrusion on its outer peripheral edge for bringing outer peripheral edges of said flanges into positive contact with each other when said tape reels are mounted respectively on said shafts with said outer peripheral edges lying on one another.

13. A tape cassette as claimed in claim 12, said outer peripheral edges being thinner than remaining portions of said flanges, said thinner portions overlapping to form a combined thickness, including said protrusion, substantially equal to that of said remaining portions.

14. A tape cassette as claimed in claim 12, said protrusion being annular and of circular section.

15. A tape cassette as claimed in claim 12, said protrusion being in the form of a series of circular elements forming a segmented annulus.

* * * * *